US008799909B1

(12) United States Patent
Libby et al.

(10) Patent No.: US 8,799,909 B1
(45) Date of Patent: Aug. 5, 2014

(54) SYSTEM AND METHOD FOR INDEPENDENT SYNCHRONOUS AND ASYNCHRONOUS TRANSACTION REQUESTS

(75) Inventors: Jeffrey G. Libby, Cupertino, CA (US); Jean-Marc Frailong, Los Altos, CA (US); Avanindra Godbole, San Jose, CA (US); Sharada Yeluri, San Jose, CA (US); Anurag P. Gupta, Saratoga, CA (US); John Keen, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1409 days.

(21) Appl. No.: 12/342,985

(22) Filed: Dec. 23, 2008

(51) Int. Cl.
*G06F 9/00* (2006.01)
*G06F 9/46* (2006.01)

(52) U.S. Cl.
CPC .................................... *G06F 9/466* (2013.01)
USPC ............................................ 718/101; 712/28

(58) Field of Classification Search
None
See application file for complete search history.

(56) References Cited

U.S. PATENT DOCUMENTS

| | | | |
|---|---|---|---|
| 4,823,304 A * | 4/1989 | Frantz et al. ................. | 709/232 |
| 5,734,903 A * | 3/1998 | Saulpaugh et al. ........... | 719/316 |
| 6,011,899 A * | 1/2000 | Ohishi et al. ................. | 386/221 |
| 6,791,898 B1 * | 9/2004 | Manapat et al. ......... | 365/233.11 |
| 7,921,075 B2 * | 4/2011 | Herness et al. ............... | 707/607 |
| 2003/0097455 A1 * | 5/2003 | Bauman et al. ............... | 709/230 |
| 2005/0038806 A1 * | 2/2005 | Ma ................................ | 707/102 |
| 2005/0201164 A1 * | 9/2005 | Barth et al. ............. | 365/189.05 |
| 2006/0179260 A1 * | 8/2006 | Yoon ............................. | 711/154 |
| 2007/0030030 A1 * | 2/2007 | Waldrop ......................... | 326/93 |
| 2007/0174575 A1 * | 7/2007 | Lovett ........................... | 711/167 |
| 2008/0091679 A1 * | 4/2008 | Herness et al. ................... | 707/8 |
| 2009/0006821 A1 * | 1/2009 | Mera et al. .................... | 712/221 |
| 2009/0052430 A1 * | 2/2009 | Gorokhov et al. ............ | 370/350 |
| 2009/0238001 A1 * | 9/2009 | Redaelli et al. .......... | 365/185.17 |

* cited by examiner

*Primary Examiner* — Keith Vicary
(74) *Attorney, Agent, or Firm* — Harrity & Harrity, LLP

(57) ABSTRACT

Systems and methods of various embodiments provide mechanisms to support synchronous and asynchronous transactions. Distinct encodings allow an instruction to choose whether to perform any operation synchronously or asynchronously. Separate synchronous and asynchronous result registers hold the data returned in the most recent replies received for synchronous and asynchronous transaction requests, respectively. A status bit indicates whether an asynchronous transaction request is currently outstanding.

19 Claims, 7 Drawing Sheets

SYSTEM AND METHOD FOR INDEPENDENT SYNCHRONOUS AND ASYNCHRONOUS TRANSACTION REQUESTS

CROSS-REFERENCE TO RELATED APPLICATIONS

Not applicable.

TECHNICAL FIELD

The present invention generally relates to synchronous and asynchronous transaction requests, and relates more particularly to software and hardware mechanisms to support independent synchronous and asynchronous transaction requests.

BACKGROUND ART

In a computing environment, a microprocessor typically interacts with other components of the computing device. These interactions, which also may be referred to as transactions or operations, are typically performed either synchronously or asynchronously. In a synchronous interaction, a microprocessor will send a message to another component and suspend processing until a reply is received, whereas in an asynchronous interaction, the microprocessor will send a message to another component and continue processing other instructions without first receiving a reply. For example, in a synchronous transaction, a thread, i.e., a sequence of instructions executing in a processor to complete a task, may request an item of data from memory and suspend further instruction processing until that item is received. However, if that item of data is not immediately needed for further processing of instructions, the data can be requested asynchronously and processing can continue without first receiving the data.

Historically, general-purpose microprocessors have provided an ad-hoc collection of mechanisms to perform operations synchronously and asynchronously. Typically, each particular operation was hard-coded to be executed either synchronously or asynchronously. Many synchronous and asynchronous operations were implicit, and thus not visible to or controllable by software. For example, a processor would synchronously fetch data or instructions from memory, and force an executing thread to stall until a requested datum or instruction arrived. As another example, a processor's data cache would asynchronously flush modified data back to memory without the executing thread necessarily being aware of the cache flush operation. Such microprocessors do not provide generic mechanisms for initiating synchronous and asynchronous operations (possibly concurrent with one another), and managing their replies separately.

SUMMARY OF INVENTION

Various embodiments flexibly and efficiently support concurrent execution of arbitrary combinations of synchronous and asynchronous operations. For example, one embodiment provides mechanisms which allow an executing thread to send synchronous and asynchronous external transaction requests to various functional units elsewhere in a device, and then receive their subsequent replies. One embodiment allows a thread to have one request of either type outstanding at any given time, or to have requests of both types outstanding concurrently. An executing thread can launch an asynchronous transaction request, continue executing and then launch a synchronous transaction request, at which time, the microprocessor will suspend further execution of the thread until it receives the synchronous transaction reply. A microprocessor according to one embodiment has separate result registers and error trap handlers for synchronous and asynchronous transaction replies, so that the replies for each type will not interfere with one another.

In one embodiment, a method in a data processing system for performing independent synchronous and asynchronous transactions comprises the steps of sending a transaction request from a processor to a component, the transaction request comprising an indicator indicating whether the transaction is synchronous or asynchronous, receiving a transaction reply, the transaction reply comprising the indicator, determining whether a transaction is synchronous or asynchronous based on the indicator, placing the transaction reply in a synchronous result register when the transaction is determined synchronous, and placing the transaction reply in an asynchronous result register when the transaction is determined asynchronous.

In another embodiment, a computer-readable medium stores computer executable instructions for performing a method of performing independent synchronous and asynchronous transactions, comprising the steps of sending an asynchronous transaction request from a processor to a component, sending a synchronous transaction request from the processor, receiving a synchronous transaction reply in a synchronous result register, and receiving an asynchronous transaction reply in an asynchronous result register.

In another embodiment, a router for performing independent synchronous and asynchronous transactions comprises one or more functional components, a packet processing engine that initiates transactions with the one or more functional components, a synchronous result register configured to receive a synchronous transaction reply from the one or more functional components, and an asynchronous result register configured to receive an asynchronous transaction reply from the one or more functional components.

Other systems, methods, features, and advantages consistent with the present invention will become apparent to one with skill in the art upon examination of the following figures and detailed description. It is intended that such additional systems, methods, features, and advantages be included within this description and be within the scope of the invention.

BRIEF DESCRIPTION OF DRAWINGS

The accompanying drawings, which are incorporated in and constitute a part of this specification, illustrate an implementation of methods and systems consistent with the present invention and, together with the description, serve to explain advantages and principles consistent with the invention. In the drawings.

DESCRIPTION OF EMBODIMENTS

Various embodiments provide general-purpose mechanisms for synchronous and asynchronous execution of operations. For any particular operation, a microprocessor instruction can choose whether to execute the operation synchronously or asynchronously. An executing thread can launch an asynchronous transaction request, continue executing and then launch a synchronous transaction request, at which time, the microprocessor will suspend further execution of the thread until it receives the synchronous transaction reply. Hence, an executing thread can have an asynchronous request and a synchronous request both outstanding at the same time. Their results can arrive in either order. The microprocessor places the returned data in separate synchronous and asynchronous result registers, so that the two outstanding requests do not interfere with one another.

One area where processors encounter situations that would benefit from transaction processing is packet processing in a network device. Network devices such as router 103 typically have a lookup unit (LU) 101, described below, to process packet headers and determine the destination, or next hop, of the packet. In some embodiments, instead of an LU, one or more other components perform this function.

Figure 1:
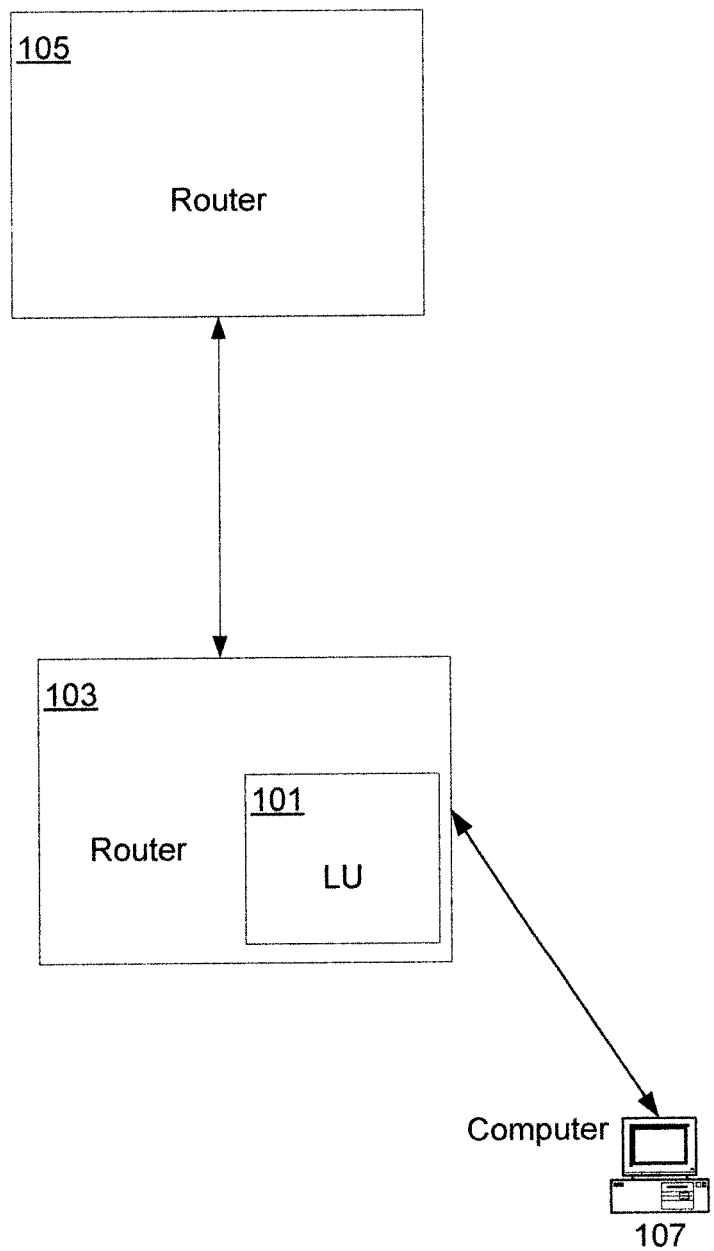
FIG. 1 is a block diagram illustrating an exemplary network environment according to one embodiment.

FIG. 1 illustrates an exemplary network according to one embodiment. Router 103 receives packets from other network devices, such as router 105. The LU 101 processes the packets and determines the next hop for each packet. Once the next hop is determined, each packet is forwarded to that device, for example, computer 107. In making this determination, packet processing engines (PPEs) or other router components not shown in FIG. 1 make synchronous and asynchronous transactions. Because of the high volume of packets received, processing synchronous and asynchronous transactions concurrently can sometimes increase efficiency significantly.

Figure 2:
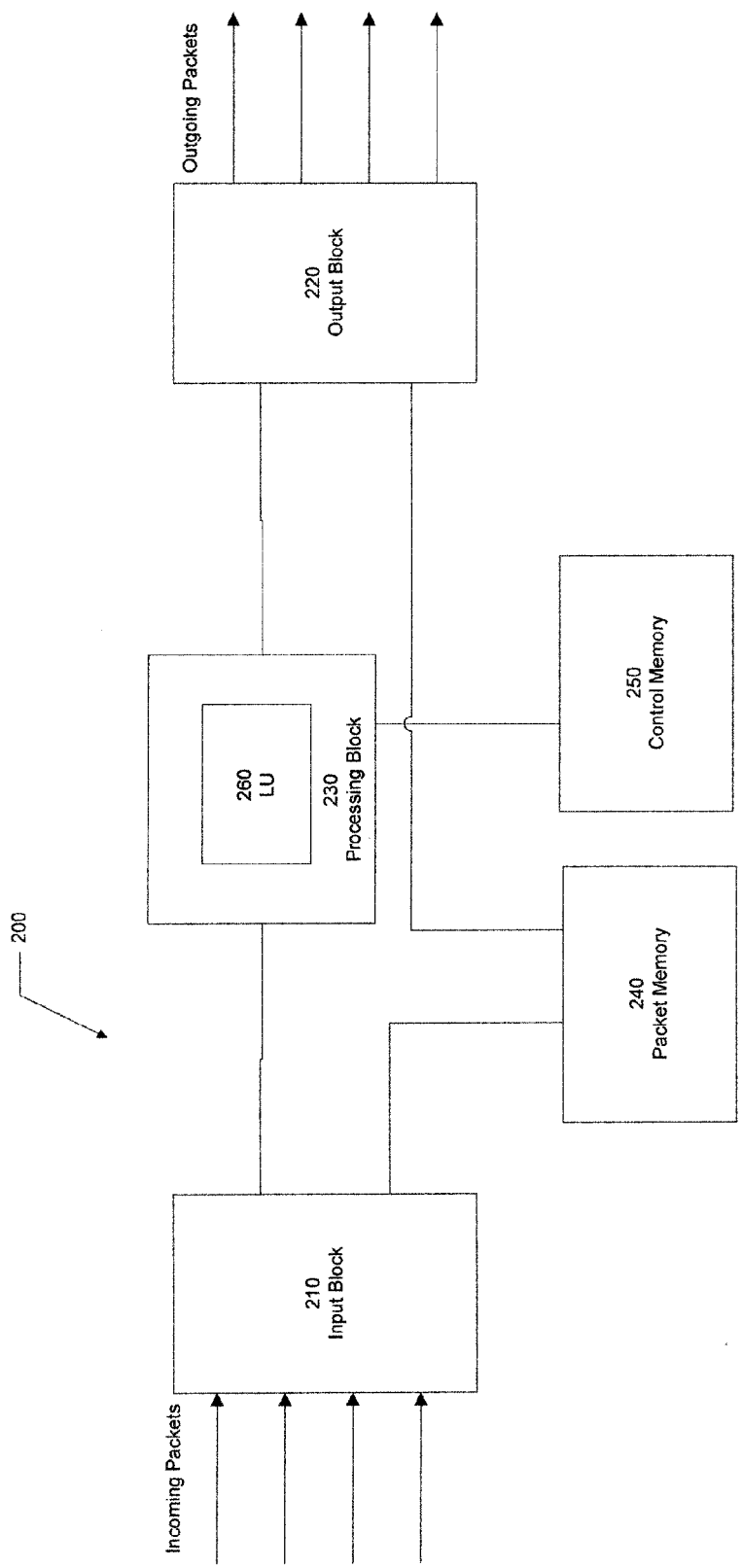
FIG. 2 is a block diagram illustrating an exemplary router according to one embodiment.

FIG. 2 is a block diagram of an exemplary data processing device 200 according to one embodiment. Device 200 may include input block 210, output block 220, processing block 230, packet memory 240, and control memory 250.

Input block 210 may include one or more input units (e.g., input line cards) that may receive packets on ingress links and perform initial processing on the packets. In one embodiment, the initial processing may include analyzing a packet to identify its control information and its packet data (e.g., payload). The control information may include information from the header of the packet, and the packet data may include information from the payload of the packet. In one embodiment, the control information may include a source address and/or a destination address from the header of a packet. In another embodiment, the control information may include a source address, a destination address, priority information, and/or other information from the header of the packet. Output block 220 may include one or more output units (e.g., output line cards) that may receive packet information from processing block 230 and/or packet memory 240, construct packets from the packet information, and output the packets on egress links.

Processing block 230 may include processing logic that may perform routing functions and handle packet transfers between input block 210 and output block 220. Processing block 230 may receive the control information from input block 210 and process the control information based on data structures stored in control memory 250. When processing the control information, processing block 230 may make certain requests to control memory 250 to read and/or write data.

Figure 6:
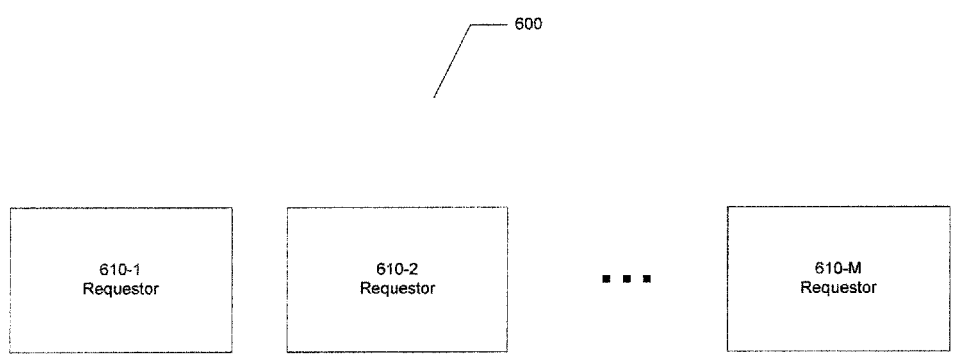
FIG. 6 is a block diagram illustrating a portion of the processing block of FIG. 2 according to one embodiment.

FIG. 6 is a diagram of an exemplary portion 600 of processing block 230. Processing block 230 may include multiple requestors 610-1, 610-2, . . . , 610-M (where M>1) (collectively referred to herein as "requestors 610"). Requestors 610 may operate independently of each other and/or in parallel. Each of requestors 610 may include processing logic to process control information associated with a particular packet. Each of requestors 610 may make requests to control memory 250 to read and/or write data to assist in the processing of the control information. In one implementation, a requestor 610 may determine how to forward a packet (e.g., determine on which egress link the packet should be transmitted), collect particular statistics regarding the packet, and/or perform one or more management functions with regard to the packet.

Returning to FIG. 2, packet memory 240 may include a memory device, such as a dynamic random access memory (DRAM). Packet memory 240 may store packet data associated with packets received by input block 210. In one implementation, packet memory 240 may store the packet data as a variable length data unit. In another implementation, packet memory 240 may store the packet data as fixed length data units. In this case, the packet data may be divided into one or more of the data units of the fixed length and stored in contiguous or non-contiguous locations in packet memory 240. If stored in non-contiguous locations, data structures, such as linked lists, may be used to identify the data units associated with a particular packet.

Control memory 250 may include a memory device, such as a DRAM or a reduced-latency DRAM (RLDRAM). Control memory 250 may store data structures to assist in the processing of packets. In one implementation, the data structures might include a routing table, a forwarding table, statistics, and/or management data (e.g., quality of service (QoS) parameters).

In one embodiment, processing block 230 includes a lookup unit (LU) 260. In one embodiment, the LU 260 may be implemented as an application-specific integrated circuit (ASIC). The LU 260 contains elements that are responsible for executing instructions that initiate synchronous and asynchronous transactions as described below.

Figure 7:
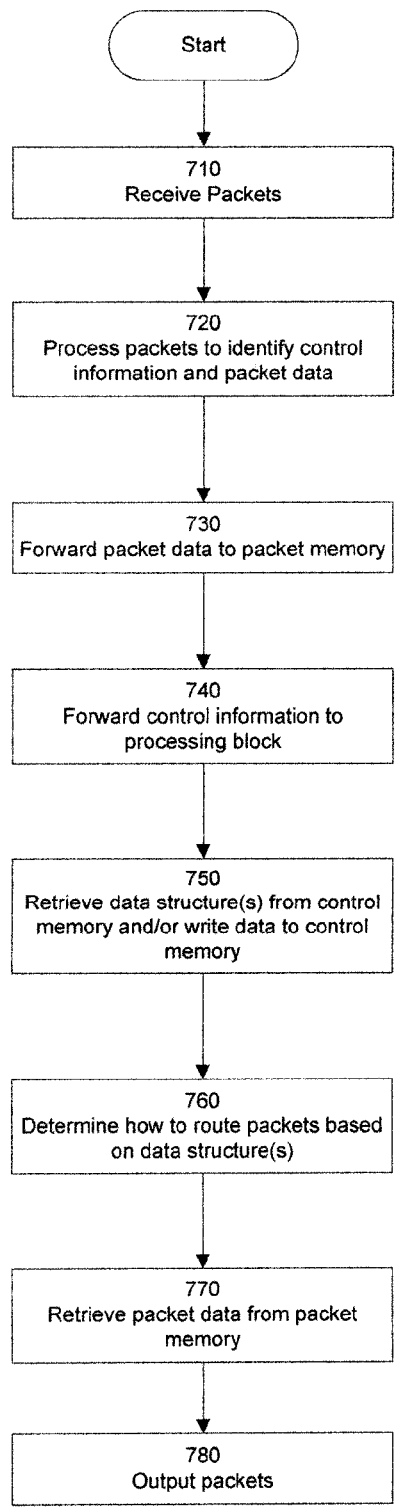
FIG. 7 is a flowchart illustrating a technique for packet handling according to one embodiment.

FIG. 7 is a flowchart of an exemplary technique for forwarding a packet by data processing device 200. Processing may begin with packets being received (block 710). For example, input block 210 may receive packets on one or more ingress links. The packets may be associated with a single stream of packets received on a particular ingress link or multiple streams of packets received on multiple ingress links.

The packets may be processed to identify their control information and their packet data (block 720). For example, input block 210 may analyze the packets to determine control information and packet data associated with the packets. As described above, the control information may be retrieved from the header of each packet and the packet data may be retrieved from the payload of each packet.

The packet data may be forwarded to packet memory 240 and the control information may be forwarded to processing block 230 (blocks 730 and 740). For example, input block 210 may send the packet data for storage in packet memory 240. As described above, the packet data associated with a particular packet may be stored in packet memory 240 as a variable sized data unit or as one or more fixed sized data units.

One or more data structures may be retrieved from control memory 250 and/or data may be written to control memory 250 (block 750). For example, a requestor 610 of processing block 230 may process control information associated with a packet. Requestor 610 may retrieve one or more data structures, such as a forwarding table, a routing table, and/or management data, from control memory 250. Requestor 610 may also, or alternatively, write one or more data structures, such as statistics data, to control memory 250. Requestor 610 may read or write data by sending a request to control memory 250. Requestors 610 may operate independently from each other and, thus, the requests from requestors 610 can form an unpredictable (almost random) access pattern across control memory 250.

It may be determined how to route the packets based on the one or more data structures retrieved from control memory 250 (block 760). For example, requestor 610 may process the control information for a packet based on the forwarding table, routing table, and/or management data to determine how the packet should be routed (e.g., on which egress link the packet should be transmitted, the priority to be given to the packet, etc.). Requestor 610 may send its processing results to output block 220. The processing results may identify the packet and the egress link on which the packet should be transmitted and might include header information associated with the packet.

Packet data may be retrieved from packet memory 240 (block 770). For example, output block 220 may receive processing results for a packet from a requestor 610 of processing block 230. Output block 220 may retrieve the packet data corresponding to the packet from packet memory 240 and reassemble the packet based on the packet data and the processing results from requestor 610.

The packets may be output on one or more egress links (block 780). For example, output block 220 may transmit the packets based on the processing results from requestors 610 of processing block 230.

The blocks of the flowchart of FIG. 7 are exemplary and illustrative only and other blocks and orders of actions may be used as desired.

Figure 3:
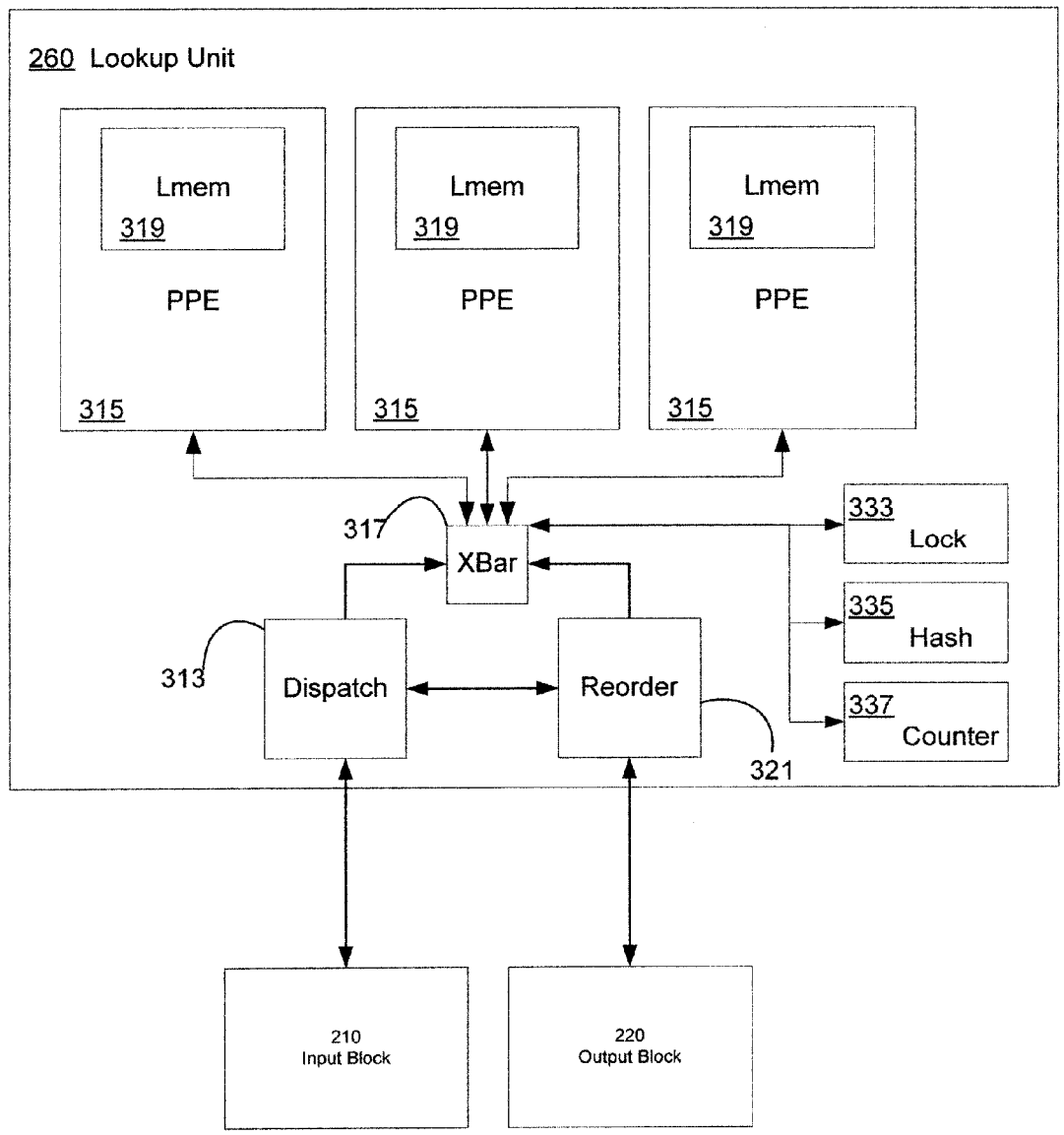
FIG. 3 is a block diagram illustrating a lookup unit according to one embodiment.

FIG. 3 is a high-level simplified block diagram of an LU 260 according to one embodiment. Some features of the LU 260 that are not relevant to the present disclosure have been omitted, and the number, configuration, and arrangement of elements of the LU 260 are not intended to represent the number, configuration, or physical layout of any embodiment, but have been simplified for clarity of the drawing. For example, in one embodiment, the LU 260 can have 16 PPEs and four crossbar switches, as well as elements that interact with memory units and other units external to the LU 260. Furthermore, although as illustrated in FIG. 3 as a lookup unit, the disclosed techniques can be implemented in a variety of other types of units, and a lookup unit is only exemplary and illustrative of such units.

LU 260 performs functions relating to packet header processing including input processing, route lookup, classification, filtering, policing, accounting, encapsulation, and statistics. The input block 210 sends packet headers to the LU 260 and the LU sends fully-processed new headers to the output block 220. Header processing is done by a collection of identical multi-threaded Packet Processing Engines (PPEs) 315, described below, that correspond to the requestors 610 of FIG. 6. Each of the PPEs 315 is identified with a PPE number. Headers come into the LU 260 via a Dispatch Block 313 and are sent to the PPEs 315 through crossbar block 317. The Dispatch Block 313 picks the least heavily loaded engine for each header. Once a PPE 315 is assigned, the header is moved to that PPE and stays within that PPE until processing on the header is completed. Each PPE 315 has its own local memory (LMem) 319 to hold the packet header and other state needed during processing. The number of PPEs in FIG. 3 is exemplary and illustrative only, and other numbers of PPEs can be used as desired to provide sufficient processing power to service the highest traffic volumes that the LU 260 is required to handle.

In some embodiments, data structures used by the PPEs 315 are kept in a single large flat address space called DMem (external to the LU 260 and not shown in FIG. 3) that is shared by the PPEs. DMem accesses between separate threads (executing in different PPEs 315, or different contexts within the same PPE 315) are not synchronized; instead, a separate Lock block 333 is provided as a mechanism for synchronizing threads. Multiple threads may share common data structures by acquiring a lock from Lock block 333, working on the data structures, and releasing the lock. A PPE 315 may also interact with several other blocks that implement special functions such as Counter block 337 for updating packet and byte counters, and Hash block 335 for obtaining a hash value. These interactions use synchronous or asynchronous transactions communicated over the crossbar block 317.

When a PPE 315 has finished processing a header, it notifies a Reorder Block 321. The Reorder Block 321 is responsible for maintaining order for headers belonging to the same flow, and pulls a header from a PPE 315 when that header is at the front of the queue for its reorder flow.

Figure 4:
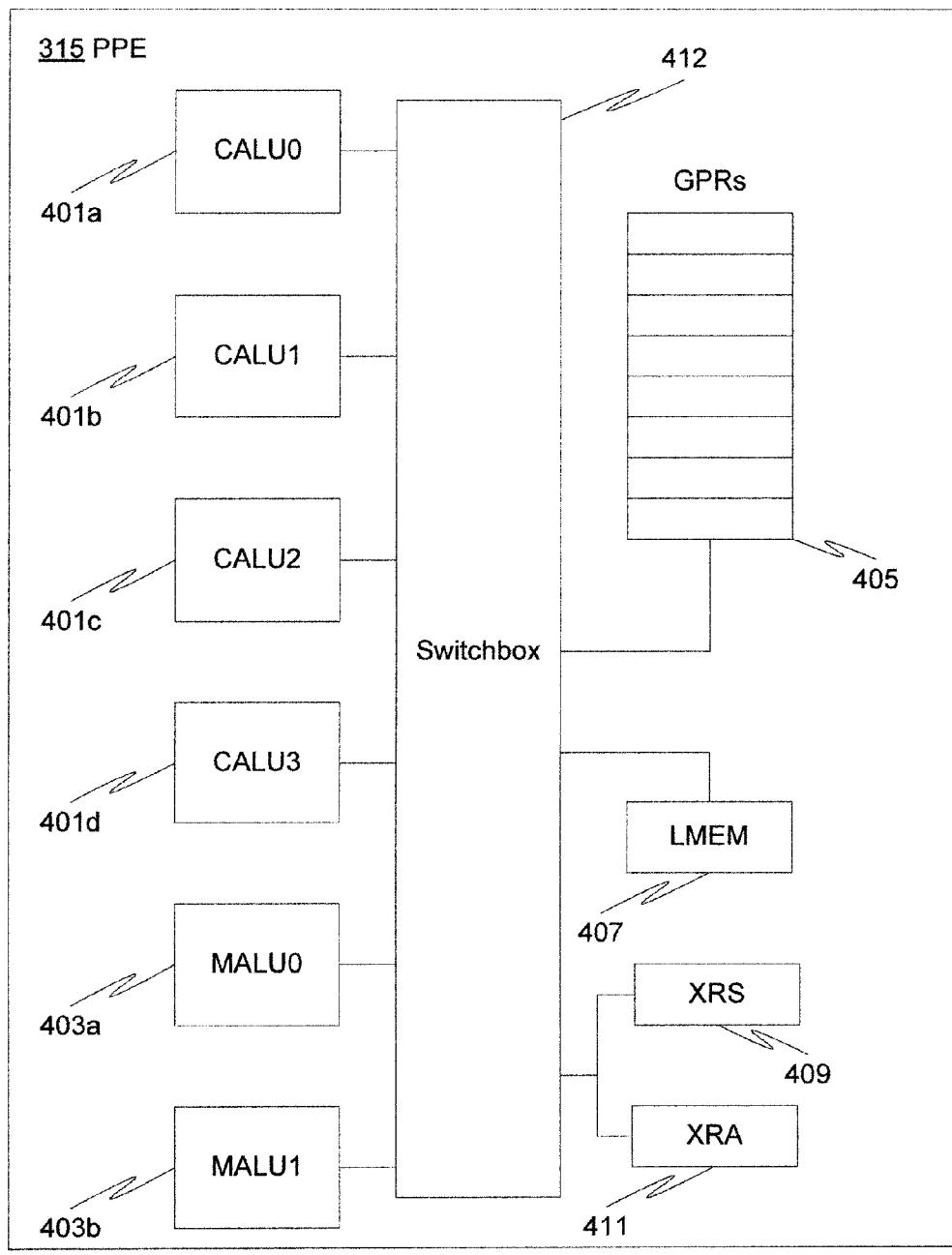
FIG. 4 is a block diagram illustrating a packet processing engine according to one embodiment.

FIG. 4 illustrates a simplified architecture of an exemplary PPE 315 according to one embodiment. Certain elements of the PPE 315 are omitted or rearranged for clarity of the drawing. The PPE 315 uses a Very Long Instruction Word (VLIW) architecture with 6 32-bit Arithmetic Logic Units (ALUs) grouped into 4 ALUs (CALU 401a-d) used for conditional branching and operand conditioning, and two main ALUs (MALU 403a-b). Each thread in the PPE 315 has access to 32 64-bit general purpose registers (GPRs) 405, and 8 KB of local memory LMem 407 (1K private per thread). A typical microinstruction allows 4 GPR reads, 2 GPR writes, 2 LMem accesses (read or write) and two 64-bit constants. A total of 6 arbitrary bit fields may be extracted and fed to the ALUs. The MALUs are used to store results back into GPRs and LMem (including 64 bit transfers) or to access external functional blocks. Synchronous result register (XRS) 409 and asynchronous result register (XRA) 411 are used for storing the results of synchronous and asynchronous transactions, respectively. XRA 411 includes a "ready" field to indicate that the result of an asynchronous transaction was received. A switchbox 412 is used to connect the various elements of the PPE 315 in one embodiment. Other embodiments may use other interconnection techniques, such as one or more busses. The above internal architecture for the PPE 315 is exemplary and illustrative only, and other internal architectures, including other numbers, configurations, and arrangements of elements, can be used as desired.

The PPE 315 initiates external transactions to external blocks that respond with a transaction reply. Examples of external transactions are DMem reads and writes, incrementing a counter, accessing a policer, reporting the hash to the Reorder block, and indicating a packet is ready to be unloaded from LMem 319. When an external transaction is initiated, the PPE 315 indicates within the transaction request whether the transaction is either synchronous or asynchronous. That indication is returned in the reply message from the external block.

A transaction request according to one embodiment includes the identifier of the functional block for which the request is intended, an address for the request (if necessary), payload data for the request (if necessary), a synchronous/asynchronous flag to indicate whether the request is synchronous or asynchronous, the PPE number, and the thread number.

A transaction reply according to one embodiment consists of 64 bits of data (if necessary), an error indication, the synchronous/asynchronous flag, the PPE number and the thread (context) number; some types of replies carry a data payload, while other types do not. When the PPE 315 receives a synchronous reply that carries data, it loads that data into the corresponding thread's XRS register 409. Similarly, when the PPE 315 receives an asynchronous reply that carries data, it loads that data into the corresponding thread's XRA register 411. The PPE 315 does not update the XRS or XRA register (409, 411) for a reply that does not carry valid data. The format and contents of the transaction request and transaction reply described above are exemplary and illustrative only and other formats and contents can be used as desired.

Figure 5:
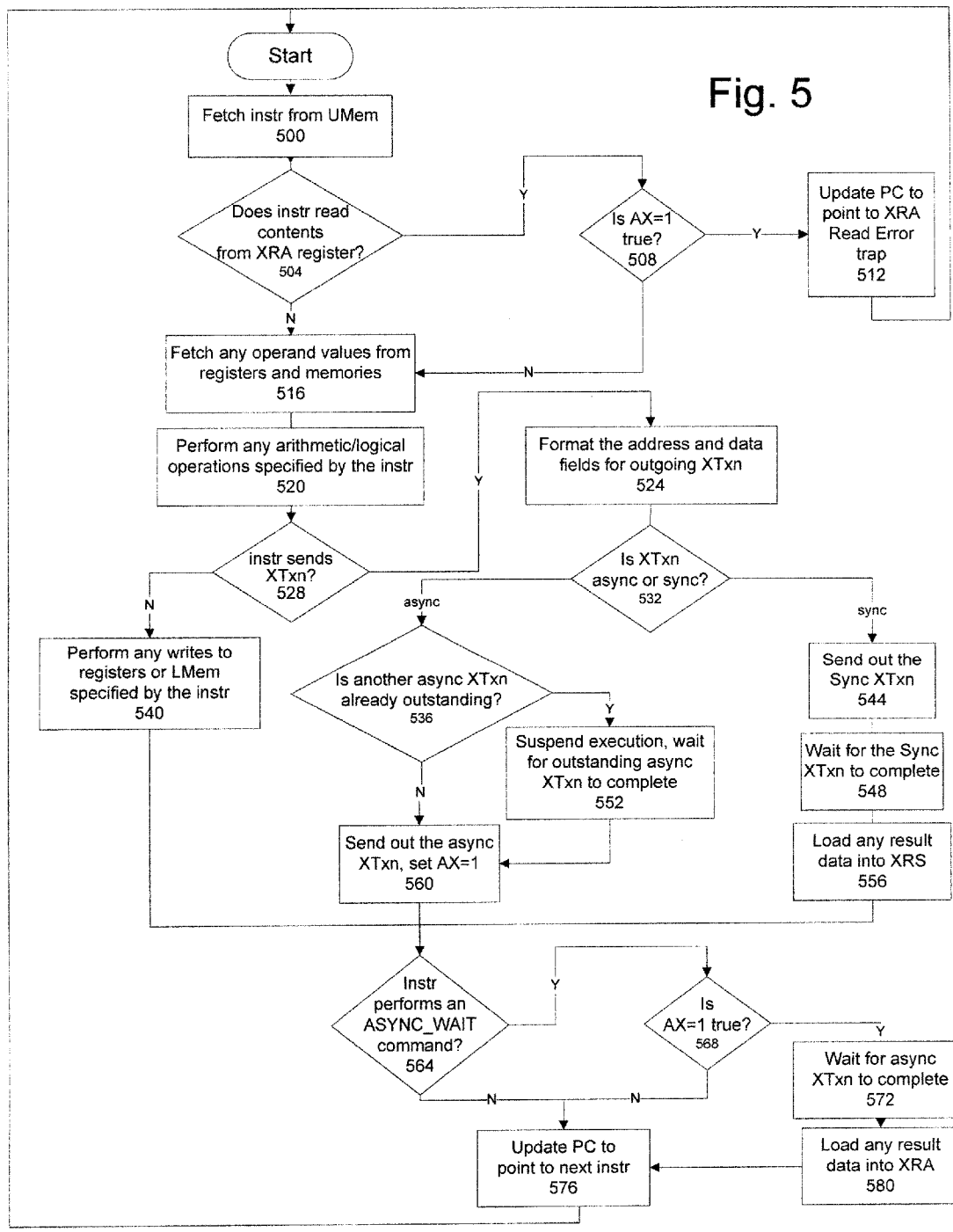
FIG. 5 is a flow chart illustrating a technique for transaction processing according to one embodiment.

FIG. 5 is a flow chart that illustrates a technique for performing independent synchronous and asynchronous transactions according to one embodiment. The steps illustrated in FIG. 5 are performed by a thread executing on the PPE 315. In step 500, the PPE 315 fetches an instruction from a microcode memory. Then in step 504, the PPE 315 determines if the instruction reads from the XRA register 411. If it does, then in step 508 the PPE determines whether an asynchronous transaction is still pending for that thread. If so, the thread takes an XRA Read Error trap in step 512.

If the microcode instruction does not read from the XRA 411, or no other asynchronous transaction is still pending for that thread, then in step 516 the PPE 315 fetches any operand values from registers and memories and in step 520 performs any arithmetic or logical operations specified by the microcode instruction.

Next, in step 528, the PPE 315 determines whether the instruction sends a transaction. If not, then in step 540, the PPE 315 performs any register or local memory writes specified by the instruction. If the instruction sends a transaction, then in step 524, the PPE 315 formats the address and data fields for the outgoing transaction, then in step 532 the PPE 315 determines whether the transaction is synchronous or asynchronous.

If synchronous, the PPE 315 sends out the synchronous transaction in step 544, then suspends the thread in step 548 until the synchronous transaction completes, then loads any result data into the XRS 409 in step 556.

If the transaction is asynchronous, then the PPE 315 determines whether another asynchronous transaction is still pending in step 536. If so, then the thread suspends processing in step 552 until the earlier asynchronous transaction completes. The second asynchronous transaction is temporarily held in a buffer while the thread is suspended. When the reply for the first asynchronous transaction is received, or if no other asynchronous transaction is pending, then the thread becomes eligible for execution again, and the buffered (or requested) asynchronous transaction is issued in step 560. A status indicator, in some embodiments, a status bit in a register, is set to indicate that an asynchronous transaction is pending. That indicator is reset by the PPE 315 when the asynchronous transaction completes and the reply for the asynchronous transaction is received.

If the instruction did not send a transaction, sent a synchronous transaction that has now completed, or issues an asynchronous transaction, then in step 564 the thread determines whether the instruction performs an ASYNC_WAIT command that the thread should perform to ensure that all previous asynchronous transactions (if any) have completed. If the instruction does not perform an ASYNC_WAIT command, then the thread updates the program counter in step 576 and begins processing the next microcode instruction. If an ASYNC_WAIT was performed and an asynchronous transaction is not still pending as determined in step 568, the ASYNC_WAIT is effectively a "no operation" command and the thread proceeds to step 576. If an asynchronous transaction is still pending, then the thread waits in step 572 for the asynchronous transaction to complete, then loads any result data into the XRA 411 in step 580 before going on to the next instruction in step 576. The status indicator is also reset so that a thread checking the status indicator will determine that no other asynchronous transaction remains pending.

The above means that the PPE thread may have up to two transaction requests pending at the same time, one asynchronous and one synchronous. This technique may be extended to allow multiple outstanding asynchronous requests, along with one outstanding synchronous request. For example, the PPE thread may have two asynchronous requests and one synchronous request in progress at the same time. The PPE may provide a separate XRA register to store the result of each outstanding asynchronous request. For example, the PPE may provide XRA1 and XRA2 registers to support as many as two outstanding asynchronous requests. Also, the PPE instruction set may be modified to indicate a distinct identification number for each asynchronous request. For example, the instruction set may offer ASYNC1 and ASYNC2 options for the type of transaction request. Furthermore, to ensure that a particular asynchronous transaction request has completed, the ASYNC_WAIT command may be modified to indicate the identification number of the asynchronous request. For example, the instruction set may provide distinct ASYNC1_WAIT and ASYNC2_WAIT commands to support two outstanding asynchronous requests. Alternatively, the ASYNC_WAIT command may be modified to accept an argument that indicates the identification number of the particular request. For example, ASYNC_WAIT (1) and ASYNC_WAIT (2). In this way, the PPE may support multiple outstanding asynchronous requests. It is noted that while the above example provides two asynchronous requests, more than two outstanding asynchronous requests may be handled by the PPE thread without departing the spirit and scope of the present disclosure.

When a transaction returns an error indication (e.g., in the event of a parity error which occurred during a read from DMem), the thread will take a trap. There are two such traps, one for synchronous transactions and one for asynchronous transactions. When the trap entry point is entered, the transaction reply register (XRS 409 or XRA 411, depending on whether the transaction was synchronous or asynchronous, respectively) will contain the error message from the transaction target. Synchronous transaction error traps are precise, asynchronous transaction error traps are imprecise.

While certain exemplary embodiments have been described in details and shown in the accompanying drawings, it is to be understood that such embodiments are merely illustrative of and not devised without departing from the basic scope thereof, which is determined by the claims that follow. By way of example and not limitation, the specific electrical and computer components utilized may be replaced by known equivalents or other arrangements of components which function similarly and provide substantially the same result.

What is claimed is:

1. A method comprising:
sending, by a data processing system, a transaction request for a transaction,
the transaction request comprising an indicator that indicates whether the transaction is synchronous or asynchronous,
the transaction being processed based on the indicator included in the transaction request,
the transaction request further comprising a thread identifier of a thread associated with the transaction request, and
the thread being associated with a synchronous result register and an asynchronous result register;
receiving, by the data processing system, a transaction reply for the transaction,
the transaction reply comprising the indicator and the thread identifier;
determining, by the data processing system, whether the transaction is synchronous or asynchronous based on the indicator that is included in the transaction reply;
determining, by the data processing system, that the transaction reply includes an error message that indicates that an error occurred during a processing of the transaction; and
placing, by the data processing system and based on the thread identifier, the error message into the synchronous result register when the transaction is synchronous,
the error message being a result of synchronous processing of the transaction when the transaction is synchronous, and
the data processing system placing the error message into the asynchronous result register when the transaction is asynchronous.

2. The method of claim 1, where the data processing system is a network device.

3. The method of claim 1, where sending the transaction request includes:
sending the transaction request to a lock block to obtain a lock on a data structure associated with the transaction.

4. The method of claim 1, where sending the transaction request includes:
sending the transaction request to a hash block to obtain a hash value for the transaction.

5. The method of claim 1, where sending the transaction request includes:
sending the transaction request to a counter block to increment a counter.

6. The method of claim 1, where, when the transaction is synchronous, the method further includes:
suspending, after sending the transaction request, further execution of the thread until the transaction reply is received.

7. The method of claim 1, where, when the transaction is asynchronous, the method further includes:
continuing, after sending the transaction request, further execution of the thread before receiving the transaction reply.

8. The method of claim 1, where the transaction request further includes:
an address of a component that is an intended recipient of the transaction request.

9. A non-transitory computer-readable medium comprising:
one or more instructions that, when executed by at least one processor, cause the at least one processor to:
send a request for a transaction,
the request comprising an indicator and a thread identifier of a thread associated with the request,
the indicator indicating that the transaction is synchronous or asynchronous,
the transaction being processed based on the indicator, and
the thread being associated with a synchronous result register and an asynchronous result register;
receive a reply for the transaction,
the reply comprising the indicator and the thread identifier;
determine that the transaction is synchronous based on the indicator included in the reply;
determine that the reply includes an error message that indicates that an error occurred during a processing of the transaction; and
store, based on the thread identifier, the error message in the synchronous result register associated with the thread.

10. The non-transitory computer-readable medium of claim 9, further comprising:
one or more instructions that, when executed by the at least one processor, cause the at least one processor to:
suspend processing associated with the thread until the reply is received.

11. The non-transitory computer-readable medium of claim 9, where the request includes:
an address of a component that is an intended recipient of the request.

12. The non-transitory computer-readable medium of claim 9, further comprising:
one or more instructions that, when executed by the at least one processor, cause the at least one processor to:
determine, before storing the error message, that the reply is for the transaction.

13. The non-transitory computer-readable medium of claim 9,
one or more instructions that, when executed by the at least one processor, cause the at least one processor to:
send an asynchronous transaction request for an asynchronous transaction after sending the synchronous transaction request,
receive an asynchronous transaction reply for the asynchronous transaction, and
store the asynchronous transaction reply in the asynchronous result register.

14. A network device comprising:
one or more hardware-implemented processors to:
initiate a transaction with one or more functional components by sending a transaction request for the transaction to the one or more functional components,
the transaction request comprising an indicator that indicates whether the transaction is synchronous or asynchronous,
the transaction being processed by the one or more functional components based on the indicator,
the transaction request including a thread identifier of a thread associated with the transaction request, and
the thread being associated with a synchronous result register and an asynchronous result register;
receive a reply, for the transaction, from the one or more functional components,
the reply comprising the indicator and the thread identifier;
determine whether the transaction is asynchronous based on the indicator;

determine that the reply includes an error message that indicates that an error occurred during a processing of the transaction; and store, based on the thread identifier, the error message in the asynchronous result register associated with the thread when the transaction is asynchronous.

15. The network device of claim 14, where the asynchronous result register includes:
a different indicator that indicates that the reply was received when the transaction is asynchronous.

16. The network device of claim 14, where the one or more functional components include at least one of:
a lock block that locks a data structure associated with the transaction,
a hash block that provides a hash value for the transaction, or
a counter block that increments a value of a counter.

17. The network device of claim 14,
where, when the transaction is synchronous, the one or more hardware-implemented processors are further to:
suspend processing after sending the transaction request until the reply is received, and
store the error message into the synchronous result register associated with the thread.

18. The network device of claim 14, where, when initiating the transaction, the one or more hardware-implemented processors are to:
fetch an instruction from a memory of the network device,
determine that the instruction sends the transaction to the one or more functional components,
determine whether the transaction is synchronous or asynchronous,
format the transaction request for the transaction,
send the transaction request to the one or more functional components, and
suspend, when the transaction is synchronous, the thread until the reply is received.

19. A device comprising:
one or more hardware-implemented processors to:
indicate within a transaction request, for a transaction, that the transaction is synchronous,
the transaction request including a thread identifier of a thread associated with the transaction, and
the thread being associated with a synchronous result register and an asynchronous result register;
send the transaction request to a functional component, the transaction being synchronously processed by the functional component based on the indicator;
receive a transaction reply, for the transaction, from the functional component,
the transaction reply including the indicator and the thread identifier;
determine that the transaction is synchronous based on the indicator included in the transaction reply;
determine that the transaction reply includes an error message that indicates that an error occurred during a processing of the transaction;
determine the thread associated with the transaction based on the thread identifier included in the transaction reply; and
load, based on the thread identifier and after determining that the transaction is synchronous, the error message into the synchronous result register of the thread.

* * * * *